(12) United States Patent
Lu et al.

(10) Patent No.: US 8,443,196 B2
(45) Date of Patent: May 14, 2013

(54) SIGNING METHOD, APPARATUS, AND SYSTEM

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 368 days.

(21) Appl. No.: 12/812,048

(22) PCT Filed: Apr. 20, 2010

(86) PCT No.: PCT/CN2010/071922
§ 371 (c)(1),
(2), (4) Date: Jul. 8, 2010

(87) PCT Pub. No.: WO2010/124565
PCT Pub. Date: Nov. 4, 2010

(65) Prior Publication Data
US 2011/0047386 A1    Feb. 24, 2011

(30) Foreign Application Priority Data
Apr. 30, 2009  (CN) .......................... 2009 1 0083284

(51) Int. Cl.
*H04L 29/00*  (2006.01)
(52) U.S. Cl.
USPC ............ 713/176; 713/177; 713/178; 713/179

(58) Field of Classification Search ........... 713/176–179
See application file for complete search history.

(56) References Cited

U.S. PATENT DOCUMENTS

| 2007/0067629 A1 | 3/2007 | Mackenzie et al. | |
| 2007/0118735 A1* | 5/2007 | Cherrington et al. | 713/155 |
| 2009/0132819 A1* | 5/2009 | Lu et al. | 713/169 |
| 2009/0216681 A1* | 8/2009 | McCown | 705/75 |

* cited by examiner

*Primary Examiner* — Ghazal Shehni
(74) *Attorney, Agent, or Firm* — Hammer & Associates, P.C.

(57) ABSTRACT

A signing method, apparatus, and system, which relate to the information security field. The present invention overcomes the problem of signature counterfeit in prior art. The client host generates a transaction message and determines the key information of the message after receiving transaction information entered by a user, forms a data packet for signing, and transmits the data packet to the USB key, which will then extract the key information and output it for confirmation by the user, and if a confirmation is received, the USB key signs the data packet and transmits a signature to the client host; after receiving the signature and the transaction message from the client host, the server extracts the key information from the transaction message to form a data packet for signing and verifies the signature against the data packet. The embodiments of the present invention are mainly applicable to the field of information security.

20 Claims, 2 Drawing Sheets

SIGNING METHOD, APPARATUS, AND SYSTEM

FIELD OF THE INVENTION

The present invention relates to the information security field, and more particularly, to a signing method, apparatus, and system.

BACKGROUND OF THE INVENTION

At present, file transfers and banking transactions over the Internet have become popular. But the security of transmitted information is a big concern.

To prevent malicious tamper to the data transmitted over the network, the digital signing technology has been introduced. Digital signing is an authentication technology. In recent years, digital signing for online banking transactions has been advanced to take place in a key device. The digital signing process in the key device includes the following steps: 1) a client host sends data to the key device before transferring the data to a server; and 2) a digital signing process is performed on the data within the key device. Thus, the transferred data is convinced to be "secure".

However, there are still some problems in above digital signing process to the knowledge of the applicants. The data is transmitted to the key device from the client host before digital signing. If a hacker or a virus has intruded into the host, it is possible that the data transmitted to the key device has been intercepted and tampered on the host side. Thus, the digital signature of a user can be counterfeited. The security of the transmitted data cannot be ensured.

SUMMARY OF THE INVENTION

The embodiments of the present invention provide a signing method, apparatus, and system for preventing a digital signature from being counterfeited and increasing the security of the transmitted data.

To achieve these objectives, the embodiments of the present invention provide a set of technical solutions as described below.

The present invention provides a first signing method, after an identifier and a separator of information for review have been shared between a client host and a server, comprising the steps of:

creating a connection between the client host and a key device;

receiving, by the client host, transaction information entered by a user via an input unit, wherein the input unit includes at least one of input means of the client host and input means of the key device;

generating, by the client host, a transaction message based on the transaction information;

determining, by the client host, key information according to the transaction message;

transferring, by the client host, a data packet for signing with the key information and the separator to the key device; and waiting for receiving a feedback from the key device by the client host.

The present invention provides a second signing method, after an identifier and a separator of information for review have been shared between a client host and a server and a key device has been connected to the client host, comprising the steps of:

receiving, by the key device, a data packet for signing from the client host;

obtaining, by the key device, key information from the data packet for signing by the separator;

outputting, by the key device, the identifier of information for review corresponding to the key information and the key information and waiting for confirmation of a user;

completing digital signing of the data packet for signing by the key device if the confirmation is received by the key device from the user within a predetermined time period, wherein the predetermined time period is a pre-defined value of time for waiting for the confirmation of the user;

transmitting, by the key device, a signature generated by the digital signing to the client host as a feedback; and returning, by the key device, a cancellation message to the client host as a feedback if a cancellation signal is received by the key device within the predetermined time period.

The present invention provides a third signing method, after an identifier and a separator of information for review have been shared between a server and a client host, comprising the steps of:

receiving, by the server, a transaction message and a signature from the client host;

obtaining, by the server, key information from the transaction message according to the identifier of information for review;

generating, by the server, a data packet for signing according to the key information and the separator; and verifying, by the server, the signature from the client host with the data packet for signing.

In another aspect, the present invention provides a client host, wherein an identifier and a separator of information for review have been shared between the client host and a server, comprising:

a connection module, adapted to establish a connection to a key device;

a local interface module, adapted to receive transaction information entered by a user via an input unit, wherein the input unit includes at least one of input means of the client host and input means of the key device;

a generation module, adapted to generate a transaction message based on the transaction information;

an obtaining module, adapted to wait for a feedback from the key device;

a first transmission module, adapted to transmit a data packet for signing with the key information and the separator to the key device; and a receipt module, adapted to receive a verification feedback from the key device.

In a third aspect, the present invention provides a key device, wherein an identifier and a separator of information for review have been shared between a client host and a server and the key device has been connected to the client host, comprising:

a receipt module, adapted to receive a data packet for signing from the client host;

an obtaining module, adapted to obtain key information from the data packet for signing according to the separator;

an output module, adapted to output the identifier of information for review corresponding to the key information and the key information and wait for information from a user;

a signing module, adapted to sign the data packet for signing if a confirmation is received from the user within a predetermined time period; the predetermined time period is a value of time the output module waits for user input; and a transmission module, adapted to transmit a signature generated by the signing module to the client host as a feedback and transmit a cancellation message to the client host as a feedback if a cancellation signal is received from the user within the predetermined time period.

In a fourth aspect, the present invention provides a server, wherein an identifier and a separator of information for review have been shared between the server and a client host, comprising:

a receipt module, adapted to receive a transaction message and a signature from the client host;

an obtaining module, adapted to obtain key information from the transaction message according to the identifier of information for review;

a generation module, adapted to generate a data packet for signing according to the key information and the separator; and a verification module, adapted to verify the signature from the client host against the data packet for signing.

In a fifth aspect, the present invention provides a signing system, comprising a client host, a key device, and a server, wherein an identifier and a separator of information for review have been shared between the client host and the server and the key device has been connected to the client host;

the client host is adapted to connect with the key device, receive transaction information entered by a user via an input unit which includes at least one of input means of the client host and input means of the key device, generate a transaction message based on the transaction information, determine key information according to the transaction message, transmit a data packet for signing with the key information and the separator to the key device, and wait for a feedback from the key device;

the key device is adapted to receive the data packet for signing from the client host, obtain the key information from the data packet for signing according to the separator, output the identifier of information for review corresponding to the key information and the key information, and wait for user input, and if a confirmation is received from the user within a predetermined time period, complete signing of the data packet, wherein the predetermined time period is a pre-defined value of time for waiting for user input, transmit a signature generated by the signing to the client host as a feedback, and if a cancellation signal is received from the user within the predetermined time period, transmit a cancellation message to the client host as a feedback; and the server is adapted to receive the transaction message and the signature from the client host, obtain the key information from the transaction message according to the identifier of information for review, generate a data packet for signing according to the key information and the separator, and verify the signature from the client host against the data packet for signing.

The signing methods, apparatuses, and system provided by the embodiments of the present invention solve the security problems in prior art that the key information can be tampered before digital signing by users and the digital signature can be counterfeited, by interaction between the user and the device allowing the user to verify the key information before digital.

BRIEF DESCRIPTION OF THE DRAWINGS

To describe the embodiments of the present invention clearly, the drawings in connection with the embodiments are introduced first below in brief. Apparently, the drawings are only used to partly demonstrate the embodiments and other drawings can be plotted by those skilled in the art to which the present invention pertains, without any creative efforts.

DETAILED DESCRIPTION OF THE PREFERRED EMBODIMENTS

Below the technical solutions of the embodiments of the present invention are described in conjunction with the drawings in details. It can be understood that the embodiments thereinafter are only a part of the total embodiments of the present invention and other embodiments obtained by those skilled in the art to which the present invention pertains without any creative efforts and without departing from the spirit or essential characters of the present invention are of the scope of the present invention.

Embodiment 1

Figure 1:
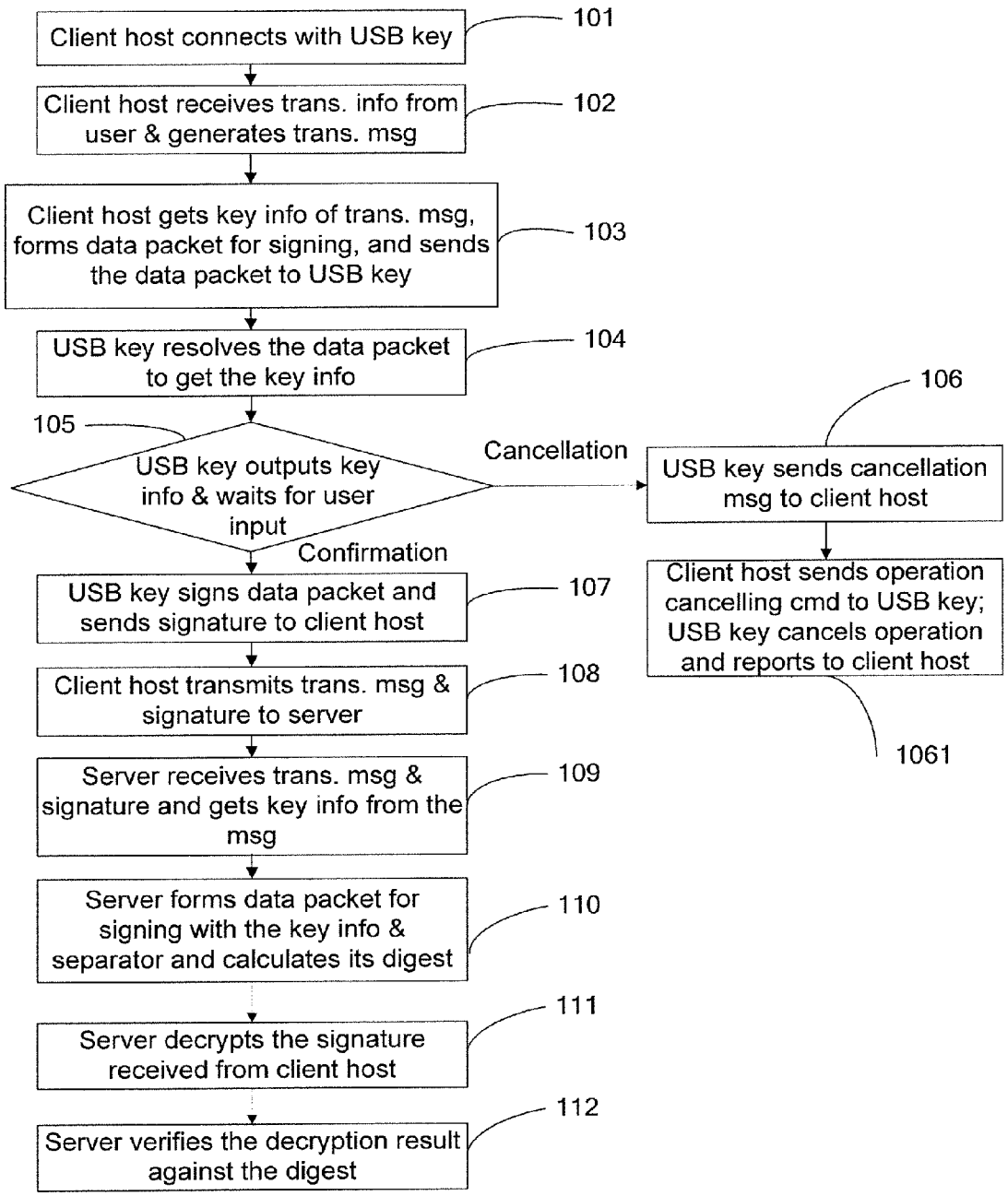
FIG. 1 is a flow diagram of the signing method of the first embodiment of the present invention.

Referring to FIG. 1, the key device is a USB key in this embodiment. In the embodiments of the present invention, the USB key is connected to a client host, and an identifier and separator of information for review have been shared between the client host and a server. The USB key has an output unit and a button. The output unit can be an LCD display or a voice speaker.

The signing method of the first embodiment comprises the following steps:

Step 101: The client host connects with the USB key.

Step 102: The client host receives transaction information from the user and generates a transaction message based on the transaction information.

In this embodiment, Step 102 particularly comprises the following operations: a local interface of the client host receives the transaction information from the user via an input unit, transfers the transaction information to a browser of the client host; and the browser generates a transaction message based on the transaction information by running embedded code, and returns the transaction message to the local interface of the client host.

The local interface (in the form of software or hardware or both of them) is installed on the client host in advance. The embedded code is the code embedded into a webpage and is downloaded from the server by the browser of the client host.

The input unit in Step 102 includes at least one of the input means of the client host and the input means of the USB key. That is, transaction information can be inputted not only by the input means of the client host, but also by the input means of the USB key. Users can use the input means to enter a part of or all of transaction information.

If users choose to enter the transaction information via the input means of the USB key, the input means of the USB key must be activated via the local interface by the embedded code of the client host before Step 102. Then, users can enter the transaction information via the input means of the USB key.

In the embodiments of the present invention, the transaction information entered by the user includes:

Target Account Name for Transfer: San ZHANG
Target Account Number for Transfer: 12345678
Amount for Transfer: 134.22

In the embodiments of the present invention, the transaction message can be in different formats. Preferably, the format of the transaction message is XML.

In the embodiments of the present invention, users can conduct various kinds of transaction. Accordingly, different transaction messages will be generated by the client host. For example, the transaction message for the in-bank transfers is:

```xml
<?xml version="1.0" encoding="utf-8"?>
<TradeInfo>
   <AccountInfo name="To"><!--Target Account Number-->
   <AccountName> San ZHANG </AccountName><!--Target Account Owner-->
      <AccountValue>12345678</AccountValue><!-- Target Account Number-->
      <!--Target Bank Info-->
      <BankInfo>
         <BankName>Bank A</BankName><!--Target Branch-->
      </BankInfo>
   </AccountInfo>
   <AccountInfo name="From">
      <AccountName>Si LI</AccountName><!--Source Account Owner-->
   <AccountValue>87654321</AccountValue><!--Source Account Number-->
      <!--Source Bank Info-->
      <BankInfo>
         <BankName>Bank B</BankName><!--Source Bank-->
      </BankInfo>
   </AccountInfo>
   <TradeData>
      <TradeMoney>134.22</TradeMoney>       <!--Transferred Amount-->
      <TradeType>1</TradeType>              <!--Transaction Type-->
      <MoneyType>2</MoneyType>              <!--Currency Type-->
      <TradeTime>20090206152645</TradeTime> <!--Transaction Date&Time-->
      <OtherData></OtherData>               <!--Other Info-->
   </TradeData>
   <SignatureData>                          <!--base64 code signature data-->
   MualIO9msIOE1IuIiH22Z8N57PzagkURnlxUgknTTXi88t+9u1Tzg0ltcYZWdG+D3LOg
DXfejPtjx01HSt293usQhRTt5SW8qte24lUvw0eMC0YHzH3Iwu0Jb5KErXrsg0OMWFZMnhbj
F33pGloQWMC23pe6Z98XCcnKR3nqBdY=
   </SignatureData>
</TradeInfo>
```

The transaction message for cross-bank transfers is:

```xml
<?xml version="1.0" encoding="utf-8"?>
<TradeInfo>
    <AccountInfo name="To"><!--Target Account Number-->
       <AccountName>San ZHANG</AccountName><!--Target Account Owner-->
       <AccountValue>10000000</AccountValue><!--Target Account Number-->
       <!--Target Bank Info-->
       <BankInfo>
          <BankName> Bank C </BankName><!--Target Bank-->
       </BankInfo>
    </AccountInfo>
    <AccountInfo name="From">
       <AccountName>Si LI</AccountName><!--Source Account Owner-->
       <AccountValue>87654321</AccountValue><!--Source Account Number-->
       <!--Source Bank Info-->
       <BankInfo>
          <BankName>Bank D </BankName><!--Source Bank-->
       </BankInfo>
    </AccountInfo>
    <TradeData>
       <TradeMoney>134.22</TradeMoney>       <!--Transferred Amount-->
       <TradeType>1</TradeType>              <!--Transaction Type-->
       <MoneyType>2</MoneyType>              <!--Currency Type-->
       <TradeTime>20090206152645</TradeTime> <!--Transaction Date&Time-->
   <AddCode>5265</AddCode>                   <!--Additional Code-->
       <OtherData></OtherData>               <!--Other Info-->
    </TradeData>
    <SignatureData>                          <!--base64 code signature data-->
    MualIO9msIOE1IuIiH22Z8N57PzagkURnlxUgknTTXi88t+9u1Tzg0ltcYZWdG+D3LOg
DXfejPtjx01HSt293usQhRTt5SW8qte24lUvw0eMC0YHzH3Iwu0Jb5KErXrsg0OMWFZMnhbj
F33pGloQWMC23pe6Z98XCcnKR3nqBdY=
    </SignatureData>
</TradeInfo>
```

The transaction message for appending account is:

```xml
<?xml version="1.0" encoding="utf-8"?>
<!--Appended Account Number-->
<AccountInfo name="Add">
   <AccountType>1</AccountType><!--Account Number Type-->
   <AccountName>San ZHANG</AccountName><!--Owner-->
   <AccountValue>12345678</AccountValue><!--Account Number-->
```

```
<AccountAlias>Wage Card</AccountAlias><!--Alias-->
<AccountPwd>B53DC83D</AccountPwd><!--Account Password-->
<!--Account Opening Bank Info-->
<BankInfo>
   <BankName>Bank A</BankName>
</BankInfo>
</AccountInfo>
```

When appending an account, the input means of the USB key is activated by the embedded code of the client host via the local interface. Then, the user can enter a password via the input means of the USB key. The password is transmitted to the embedded code by the local interface. Thus, the malicious programs that may be running on the client host, for example, a Trojan program, can be prevented from intercepting the password.

Step 103: the client host resolves the transaction message, extracts key information according to the identifier of information for review that is previously determined, forms a data packet for signing, transfers the data packet for signing to the USB key, and waits for a feedback from the USB key. A time limit is configured in advanced on the client host for waiting for the feedback.

Step 103 particularly comprises the following operations: the local interface of the client host receives the transaction message, extracts key information from the transaction message according to the identifier of information for review, arranges the key information in a pre-defined order and separates the elements of the key information with a semicolon (";") to form a data packet for signing, and waits for a feedback from the USB key. The feedback can be a cancellation message or a signature etc.

For example, in a transaction message for in-bank transfers, the owner name, the account number, and the amount are identifiers of information for review. The following key information is extracted from the transaction message for in-bank transfers according to the identifiers:
San ZHANG (owner name) 12345678 (account number) 134.22 (amount)
The generated data packet for signing is:
12345678; San ZHANG; 134.22;
For example, in a transaction message for cross-bank transfers, the owner name, the account number, the amount, and the additional verification code are identifiers of information for review. The key information extracted from the transaction message for cross-bank transfers according to the identifiers is:
San ZHANG (owner name) 10000000 (account number) 134.22 (amount) 5265 (additional verification code)
The additional verification code is generated by the server in a random manner.
The generated data packet for signing is:
10000000; San ZHANG; 134.22; 5265;
For example, in a transaction message for appending an account, the account number and the password are identifiers of information for review. The key information extracted from the transaction message for appending an account according to the identifiers is:
12345678 (account number) B53DC83D (password)
The generated data packet for signing is:
12345678; B53DC83D;
In this embodiment, Step 103 can also comprise the following operations: the client host receives digital key information entered by the user via the input means of the USB key (for example, the digital key information is 12345678 [account number] 134.22 [amount] for the transaction message for in-bank transfers), extract key information from the transaction message generated at Step 102 according to the identifier of information for review (for example, the key information is San ZHANG [owner name] 134.22 [amount]) for the transaction message for in-bank transfers), and returns the amount information to the USB key; the USB key compares the amount entered by the user with the amount returned by the client host; if they do not match, an error message is output; if they match, the USB key sends back the amount information to the client host; the client host arranges the owner name, the account number, and the amount (i.e. San ZHANG 12345678 134.22) in a specific order and separate them with a semicolon (";") to form a data packet for signing, transmits the data packet to the USB key, and waits for a feedback from the USB key. A time limit is configured in advanced on the client host for waiting for the feedback.

In prior art, the input means of the USB key can only be used to enter numbers. Thus, the key information entered by the user via the USB key is digital information. The digital key information can be part of the entire key information. At Step 102, the transaction information is entered by the user via the input means of the client host. Before the client host receives the key information entered by the user via the input means of the USB key, the following step must be completed: the embedded code of the client host activates the input means of the USB key via a local interface.

In this embodiment, the client host adapts some characters of the transaction message to the USB key.

For example, if the owner name of the transaction message consists of Chinese characters in UTF-8 code while the USB key supports the GB18030 character set, the client host will convert the owner name to characters in GB18030 code.

Step 104: the USB key receives the data packet for signing and obtains the key information from the data packet according to the separator.

At Step 104, the operation of obtaining the key information from the data packet according to the separator particularly comprises: the USB key detects the number of the separators (";") and resolves the data packet for signing according to the number of the separators, gets the key information from the result of resolving. For example:

If the USB key detects 2 separators, the transaction information is of an account appending transaction, and the key information includes the account number and the password in order. In this embodiment, they are:
12345678 (account number) B53DC83D (password)
If the USB key detects 3 separators, the transaction information is of an in-bank transfer transaction, and the key information includes the account number, the owner name, and the amount in order. In this embodiment, they are:
San ZHANG (owner name) 12345678 (account number) 134.22 (amount)
If the USB key detects 4 separators, the transaction information is of a cross-bank transfer transaction, and the key information includes the account number, the owner name, the amount, and the additional verification code in order. In this embodiment, they are:

San ZHANG (owner name) 10000000 (account number) 134.22 (amount) 5265 (additional verification code)

If the USB key detects other numbers of separators, the information is not of a transaction message.

Step 105: the USB key outputs the identifiers of information for review corresponding to the key information and the key information according to the resolving result, and waits for user input.

In this embodiment, Step 105 particularly comprises the following operations:

For an account appending transaction, the USB key displays or reports (via voice) the identifier of information for review (the account number) and the key information (12345678) and waits for the user to enter a password and confirm it by pressing a button; then, the USB key verifies the password entered by the user; if the password is incorrect, Step 106 is conducted; otherwise, Step 107 is conducted.

For an in-bank transfer transaction, the USB key displays or reports (via voice) the identifiers of information for review (the owner name, the account number, and the amount) and the key information (San ZHANG 12345678 134.22) and waits for user input. If the user provides a cancellation signal by pressing a button, Step 106 is conducted; otherwise, if the user provides a confirmation signal by pressing a button, Step 107 is conducted.

For a cross-bank transfer transaction, the USB key displayed or reports (via voice) the identifiers of information for review (the owner name, the account number, the amount, and the additional verification code) and the key information (San ZHANG 10000000 134.22 5265) and waits for user input; if the user provides a cancellation signal by pressing a button, Step 106 is conducted; otherwise, if the user enters an additional verification code and confirms it by pressing a button, the USB key replaces the additional verification code of the transaction message with the additional verification code entered by the user for calculation. If the calculation has an error, Step 106 is conducted; otherwise, Step 107 is conducted.

For information other than the above 3 transactions, Step 107 is conducted.

Step 106: the USB key sends an error message or a cancellation message to the client host.

Step 1061: the client host sends an operation cancellation command to the USB key; the USB key cancels the operation after receiving the command and reports the client host on the cancellation.

In this embodiment, the client host can send an operation cancellation command to the USB key at any time. In other words, Step 1061 can be conducted at any time.

If Step 1061 is conducted, the subsequent steps of this embodiment will not be conducted.

Step 107: the USB key signs the data packet for signing and gets a signature and transmits the signature to the client host.

The operation of signing the data packet for signing by the USB key particularly comprises the following actions: the USB key calculates a digest of the data packet for signing using a hash algorithm, and encrypts the digest using a public key cryptographic algorithm to get a signature.

Step 108: the client host receives the signature from the USB key within the predetermined time period, and transmits the transaction message and the signature to the server.

Step 109: the server receives the transaction message and the signature from the client host, and obtains key information from the transaction message according to the identifier of information for review.

At Step 109, if some characters have been converted at Step 103, the server converts the characters accordingly based on the convention between the server and the client host.

Step 110: the server forms a data packet for signing according to the key information it has obtained, and calculates a digest of the data packet for signing.

At Step 110, the operation of forming a data packet for signing according to the key information the server has obtained comprises the following actions: the server arranges the elements of the key information in a specific order that has been determined in advance, and separate them with a semicolon (";") to form a data packet for signing.

At this step, the server uses the same algorithm for calculating the digest of the data packet for signing as used at Step 107 for calculating the digest of the data packet for signing.

Step 111: the server decrypts the signature from the client host and gets a decrypting result.

Step 112: the server compares the digest generated at Step 110 with the decrypting result generated at Step 111; if they match, the verification is successful; otherwise, the verification is failed.

The signing method provided by this embodiment of the present invention solves the security problems that the key information can be tampered before digital signing by users and the digital signature can be counterfeited, by interaction between the user and the device allowing the user to verify the key information in the process of signing. In addition, the information for review and the transaction information are rendered separately, which is helpful for the scalability of system.

Embodiment 2

Figure 2:
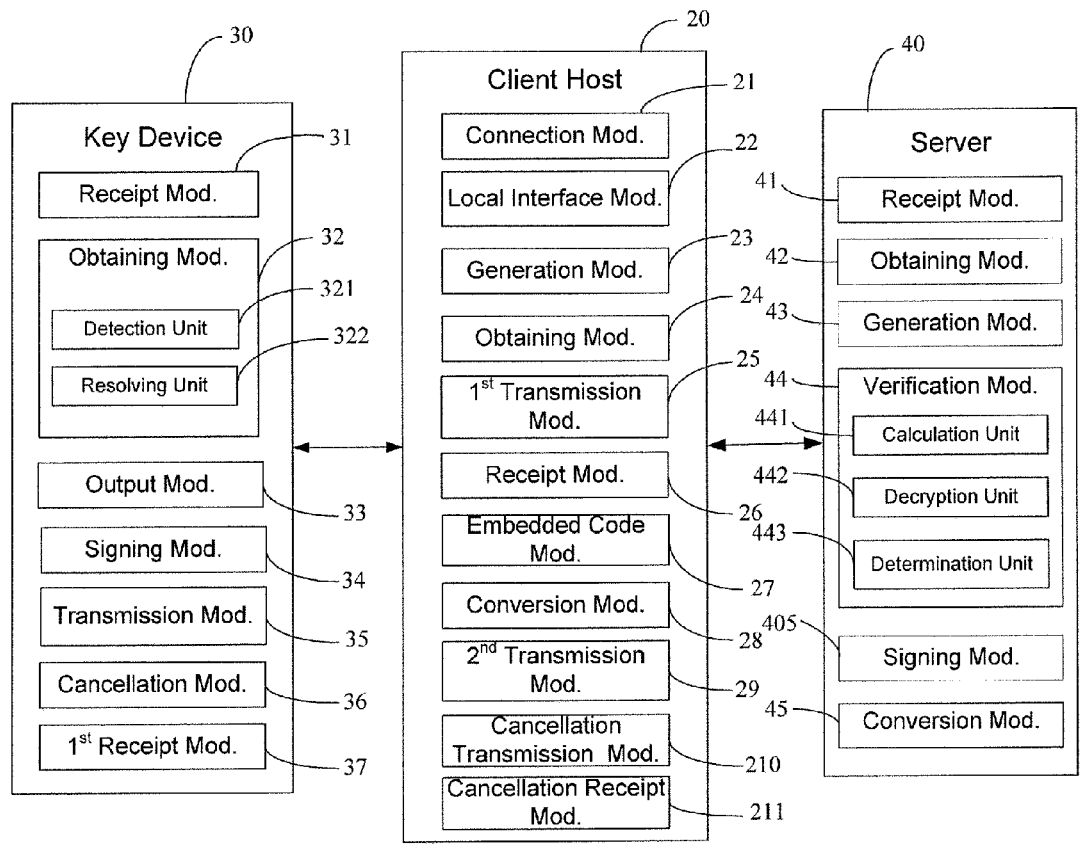
FIG. 2 is a block diagram of the signing device of the second embodiment of the present invention.

Referring to FIG. 2, the second embodiment of the present invention provides a client host 20, a key device 30, and a server 40 for implementation of the method of the first embodiment. The key device 30 is connected to the client host 20. An identifier and separator of information for review have been shared between the client host 20 and the server 40. The client host 20 includes a connection module 21, a local interface module 22, a generation module 23, an obtaining module 24, a first transmission module 25, and a receipt module 26.

The connection module 21 is adapted to connect with the key device 30. After it is connected to the key device 30, the local interface module 22 is adapted to receive transaction information entered by the user via an input unit. The input unit includes at least one of the input means of the client host and the input means of the key device. The generation module 23 is adapted to generate a transaction message based on the transaction information. The obtaining module 24 is adapted to determine key information of the transaction message. The first transmission module 25 is adapted to transmit a data packet for signing with the separator and the key information obtained by the obtaining module 24 to the key device 30. The receipt module 26 is adapted to wait for a feedback from the key device 30 after the data packet for signing has been sent out by the first transmission module 2.

Furthermore, the client host 20 also includes an embedded code module 27 and a conversion module 28 (both are optional).

The embedded code module 27 is adapted to activate the input means of the key device 30 via the local interface module 22. The conversion module 28 is adapted to convert the character type of the transaction message to a type recognizable to the key device 30.

The generation module 23 is adapted to generate a transaction message based on the transaction information via the embedded code module 27. The local interface module 22 is also adapted to resolve the transaction message generated by the generation module 23 and get the key information.

The obtaining module 24 particularly obtains the key information from the transaction message received by the local interface module 22 according to the identifier of information for review, or obtains the digital key information entered by the user via the input means of the key device 30 after the input means has been activated by the embedded code module 27 via the local interface module 22 and extracts key information from the transaction message according to the identifier of information for review, and verify the digital key information against the extracted key information, and if they match, arranges the elements of the key information in a specific order.

The above modules can be integrated or be deployed separately. These modules can be integrated into a single module or be further divided into child modules.

Furthermore, a time period is pre-determined on the client host 20. The client host 20 also includes a second transmission module 29, a cancellation transmission module 210, and a cancellation receipt module 211 (which are optional).

The second transmission module 29 is adapted to, if the local interface module 22 has received a feedback from the key device 30 within the predetermined time period and in particular the feedback is a signature, transmit the signature and the transaction message to the server 40. The cancellation transmission module 210 is adapted to, if the local interface module 22 has received a feedback from the key device 30 within the predetermined time period and in particular the feedback is a cancellation message, transmit an operation cancelling command to the key device 30. The cancellation transmission module 210 is also adapted to transmit an operation cancelling command to the key device 30 at any time before the predetermined time period expires when the client host 20 is waiting for a feedback from the key device 30. The cancellation receipt module 211 is adapted to receive a message reporting the operation has been cancelled from the key device 30.

Because the transaction information can be entered via the input means of the key device, the possibility of acquisition of the transaction information by attackers is reduced. The key information can be obtained and be transmitted to the key device for review. Thus, the security of data is enhanced.

The key device 30 can be a USB key. Referring to FIG. 2, the key device 30 includes a receipt module 31, an obtaining module 32, an output module 33, a signing module 34, and a transmission module 35.

The receipt module 31 is adapted to receive the data packet for signing from the client host 20. The obtaining module 32 is adapted to obtain key information from the data packet for signing received by the receipt module 31 according to the separator. The output module 33 is adapted to output the identifier of information for review corresponding to the key information and the key information obtained by the obtaining module 32 and wait for user input. The signing module 34 is adapted to sign the data packet for signing if a confirmation is received from the user within the predetermined time period. The predetermined time period is specified for the output module 33 to wait for user input. The transmission module 35 is adapted to transmit a signature generated by the signing by the signing module 34 to the client host 20 as a feedback. The transmission module 35 is also adapted to transmit a cancellation message to the client host 30 as a feedback if a cancellation signal has been received from the user within the predetermined time period.

The obtaining module 32 includes a detection unit 321 and a resolving unit 322.

The detection unit 321 is adapted to detect the number of separators in the data packet for signing. The resolving unit 322 is adapted to resolve the data packet for signing to get key information according to the number of the separators in the data packet detected by the detection unit 321.

The output module 33 includes a display unit 331. The display unit 331 is adapted to render the identifier of information for review corresponding to the key information and the key information on a display. In this embodiment, the display unit 331 can also be replaced with a broadcasting unit, for broadcasting the identifier of information for review and the key information via a voice speaker.

Furthermore, the key device 30 can also include a cancellation module 36 and a first receipt module 37 (both are optional).

The cancellation module 36 is adapted to cancel the operation and report to the client host 20 that the operation has been cancelled if no confirmation or cancellation signal is received from the user within the predetermined time period, or if an operation cancelling command is received from the client host 20 within the predetermined time period. The first receipt module 37 is adapted to receive the operation cancelling command from the client host 20. The cancellation module 36 is also adapted to cancel the operation and report to the client host 20 that the operation has been cancelled when the first receipt module 37 has received the operation cancelling command.

By allowing review through the interaction between the user and the device, the user is able to confirm the key information of a transaction to prevent tamper to the transaction information and signature counterfeit. Thus, the security of data is enhanced.

Referring to FIG. 2, the server 40 includes a receipt module 41, an obtaining module 42, a generation module 43, and a verification module 44.

The receipt module 41 is adapted to receive the transaction message and signature from the client host 20. The obtaining module 42 is adapted to obtain key information from the transaction message received by the receipt module 41 according to the identifier of information for review. The generation module 43 is adapted to generate a data packet for signing according to the key information obtained by the obtaining module 42 and the separator. The verification module 44 is adapted to verify the signature from the client host 20 against the data packet for signing generated by the generation module 43.

The verification module 44 includes a calculation unit 441, a decryption unit 442, and a determination unit 443.

The calculation unit 441 is adapted to calculate the digest of the data packet for signing. The decryption unit 442 is adapted to decrypt the signature received from the client host 20. The determination 443 is adapted to determine if the decryption result of the decryption unit 442 and the digest of the data packet for signing calculated by the calculation unit 441 match. If they match, the verification is passed. Otherwise, the verification fails.

Furthermore, the server 40 also includes a conversion module 45.

The conversion module 45 is adapted to convert the character type of the transaction message to a type recognizable to the key device 30.

By enabling review of transaction information through interaction between the user and the device, the problem of signature counterfeit in the prior art is overcome. Thus, the security of data is increased.

Embodiment 3

Figure 3:
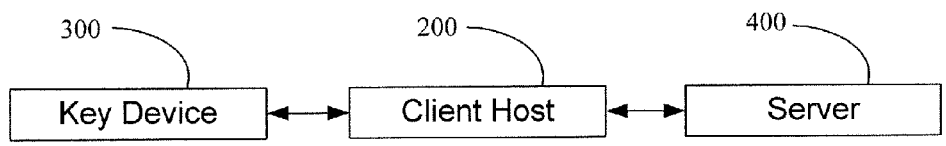
FIG. 3 is a block diagram of the signing system of the third embodiment of the present invention.

Referring to FIG. 3, a signing system is provided in the third embodiment. The signing system includes a client host 200, a key device 300, and a server 400. The key device 300 is connected with the client host 200. An identifier and a separator of information for review have been shared between the client host 200 and the server 400.

The client host 200 is adapted to receive transaction information entered by the user via an input unit after being connected with the key device 300. The input unit includes at least one of the input means of the client host 200 and the input means of the key device 300. The client host 200 generates a transaction message based on the transaction information it has received and determines key information of the transaction message. After that, the client host 200 transmits a data packet with the key information and the separator to the key device 300 and waits for a feedback from the key device 300. The key device 300 is adapted to receive the data packet for signing from the client host 200, obtain key information from the data packet for signing according to the separator, output the identifier of information for review corresponding to the key information and the key information, and wait for user input. If a confirmation signal is received from the user within a predetermined time period, the key device 300 signs the data packet for signing, thereby to get a signature. The predetermined time period is a time limit for waiting for user input. Then, the key device 300 transmits the signature to the client host 200 as a feedback. If a cancellation signal is received from the user within the predetermined time period, the key device 300 transmits a cancellation message to the client host 200 as a feedback. The server 400 is adapted to receive the transaction message and the signature from the client host 200, obtain key information from the transaction message according to the identifier of information for review, generate a data packet for signing according to the key information and the separator, and verify the signature received from the client host 200 against the data packet for signing it has generated.

A time limit is also pre-determined on the host client 200. If the client host 200 receives a feedback which is particularly a signature from the key device 300 within the limited time period, it will transmit a transaction message and a signature to the server 400.

By allowing user review of transaction information before signing a transaction, the possibility of signature counterfeit by attackers is reduced. Thus, the security of data is increased.

With the description of the embodiments, those skilled in the art can clearly understand that the present invention can be implemented via software plus necessary common hardware platforms, and of course, via hardware only as an alternative approach. However, the first approach is of better embodiments in most cases. On the basis of the understanding, the technical solutions of the present invention or the parts of the present invention that reinforce the prior art can be implemented as software products actually. The software products can be stored on storage media accessible to computers, such as the floppy disk, the hard drive, or the CD-ROM, including some instructions to enable a key device to perform the processes disclosed by the embodiments of the present invention.

It will be appreciated by those skilled in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A signing method, wherein after an identifier and a separator of information for review have been shared between a client host and a server, the method comprises the steps of:
   operations by the client host:
      creating a connection between the client host and a key device;
      receiving transaction information entered by a user via an input unit which comprises at least one input of the client host and input of the key device;
      generating a transaction message based on the transaction information;
      determining key information according to the transaction message;
      transferring to the key device a data packet for signing with the key information and the separator; and
      waiting for receiving a first or second feedback from the key device by the client host,
   operations by the key device:
      receiving from the client host the data packet for signing;
      obtaining the key information from the data packet for signing by the separator;
      outputting the identifier of information for review corresponding to the key information, and waiting for confirmation of the user;
      completing digital signing of the data packet for signing if the confirmation is received by the key device from the user within a predetermined time period, in which the predetermined time period is a pre-defined value of time for waiting for the confirmation of the user;
      transmitting a signature generated by the digital signing to the client host as the first feedback; and
      returning a cancellation message to the client host as the second feedback if a cancellation signal is received by the key device within the predetermined time period, and
   operations by the server:
      receiving the transaction message and the signature from the client host;
      obtaining key information from the transaction message according to the identifier of information for review;
      generating the data packet for signing according to the key information and the separator; and
      verifying the signature from the client host with the data packet for signing wherein said confirmation of the user comprise the client host receives digital key information entered by the user via the input of the key device, extracts the key information from the transaction message according to the identifier of information for review, and verifies the digital key information against the key information extracted from the transaction message.

2. The method of claim 1, wherein a local interface is pre-installed on the client host; and the receiving transaction information entered by the user via an input unit comprises such a step that the local interface of the client host receives the transaction information entered by the user via the input unit.

3. The method of claim 1, wherein a local interface and embedded code are pre-installed on the client host; and if the client host receives the transaction information entered by the user via both the input of the client host itself and the input of the key device, or the client host receives the transaction information entered by the user via the input of the key device only, the method comprises the following step before receiving the transaction information: the embedded code activates the input of the key device through the local interface.

4. The method of claim 1, wherein a local interface and embedded code are pre-installed on the client host.

5. The method of claim 1, wherein a time limit is predetermined on the client host; and if the client host receives the first feedback from the key device within the time limit and the first feedback is the signature, the method further comprises the following step: the client host transmits the signature and the transaction message to the server.

6. The method of claim 1, wherein a time limit is predetermined on the client host; and if the client host receives the first or second feedback from the key device within the time limit and the feedback is the cancellation message, the method further comprises the following steps:
the client host transmits an operation cancelling command to the key device; and the client host receives a message reporting that operation has been cancelled from the key device,
before the time limit expires, during the client host is waiting for the feedback from the key device, the method further comprises the following steps:
the client host transmits an operation cancelling command to the key device at any time; and the client host receives the message reporting that operation has been cancelled from the key device.

7. The method of claim 1, wherein the obtaining key information from the data packet for signing by the separator comprises the following steps: the key device detects number of separators in the data packet for signing; and the key device resolves the data packet for signing according to the number of separators to obtain the key information.

8. The method of claim 1, wherein outputting the identifier of information for review corresponding to the key information and the key information comprises the following step: the key device renders the identifier of information for review corresponding to the key information and the key information via a display; or the key device broadcasts the identifier of information for review corresponding to the key information and the key information via a voice speaker.

9. A key device, wherein an identifier and a separator of information for review have been shared between a client host and a server and the key device has been connected to the client host, said key device comprises:
a non-transitory computer readable medium having computer software modules executed by said key device, the computer software modules comprising:
a receipt module configured to receive a data packet for signing from the client host;
an obtaining module configured to obtain key information from the data packet for signing by the separator;
an output module configured to output the identifier of information for review corresponding to the key information, and wait for information from a user;
a signing module configured to sign the data packet for signing if a confirmation is received from the user within a predetermined time period; the predetermined time period is a value of time for which the output module waits for user input; and
a transmission module configured to transmit a signature generated by the signing module to the client host as a feedback, and transmit a cancellation message to the client host as a feedback if a cancellation signal is received from the user within the predetermined time period wherein said confirmation from the user comprise the client host receives digital key information entered by the user via the input of the key device, extracts the key information from the transaction message according to the identifier of information for review, and verifies the digital key information against the key information extracted from the transaction message.

10. The key device of claim 9, wherein the obtaining module comprises: a detection unit configured to detect number of separators in the data packet for signing; and
a resolving unit configured to resolve the data packet for signing by the number of separators to obtain the key information.

11. The key device of claim 9, wherein the key device further comprises: a cancellation software module configured to cancel operation and report to the client host that the operation has been cancelled if no confirmation or cancellation signal has been received from the user within the predetermined time period or if the cancellation message has been received from the client host within the predetermined time period; and
a first receipt software module configured to receive an operation cancelling command from the client host;
the cancellation software module is also configured to cancel the operation and report to the client host that the operation has been cancelled when the operation cancelling command is received by the first receipt software module.

12. The key device of claim 9, wherein the output module comprises:
a display unit configured to render the identifier of information for review corresponding to the key information and the key information via a display; or
a broadcasting unit configured to broadcast the identifier of information for review corresponding to the key information and the key information via a voice speaker.

13. A signing system, comprising a client host, a key device, and a server, wherein an identifier and a separator of information for review have been shared between the client host and the server, and the key device has been connected to the client host;
the client host is configured to connect with the key device, receive transaction information entered by a user via an input unit which comprises at least one input of the client host and input of the key device, generate a transaction message based on the transaction information, determine key information according to the transaction message, transmit a data packet for signing with the key information and the separator to the key device, and wait for a first feedback from the key device;
the key device is configured to receive the data packet for signing from the client host, obtain the key information from the data packet for signing according to the separator, output the identifier of information for review corresponding to the key information, and wait for user input, and if a confirmation is received from the user within a predetermined time period, complete signing of the data packet, in which the predetermined time period is a pre-defined value of time for waiting for user input, transmit a signature generated by the signing system to the client host as the first feedback, and if a cancellation message is received from the user within the predetermined time period, transmit the cancellation message to the client host as a second feedback; and the server is configured to receive the transaction message and the signature from the client host, obtain the key information from the transaction message according to the identifier of information for review, generate the data packet for signing according to the key information and the separator, and verify the signature from the client host against the data packet for signing wherein said confirmation from the user comprise the client host receives digital key information entered by the user via the input of the key device, extracts the key information from the transaction message according to the identifier of information for review, and verifies the digital key information against the key information extracted from the transaction message.

14. The signing system of claim 13, wherein the client host comprises:
a non-transitory computer readable medium having computer software modules executed by said client host, the computer software modules comprising:
  a connection module configured to connect with the key device;
  a local interface module adapted configured to receive the transaction information entered by the user via the input unit which comprises at least one input of the client host and input of the key device;
  a generation module configured to generate the transaction message based on the transaction information;
  an obtaining module configured to determine the key information of the transaction message;
  a first transmission module configured to transmit the data packet with the key information and the separator to the key device; and
  a receipt module configured to wait for and receive the first or second feedback from the key device.

15. The signing system of claim 14, wherein the client host further comprises: an embedded code module configured to activate the input of the key device via the local interface module.

16. The signing system of claim 15, wherein the obtaining module obtains the key information from the transaction message according to the identifier of information for review; or, the obtaining module obtains digital key information entered by the user via the input of the key device, extracts the key information from the transaction message according to the identifier of information for review, and verifies the digital key information against the key information that has been extracted after the embedded code module activates the input of the key device via the local interface module; and if the digital key information and the key information that has been extracted match, the obtaining module arranges the key information in a specific order.

17. The signing system of claim 14, wherein a time limit is predetermined on the client host, and the client host further comprises:
a second transmission software module configured to, if the local interface module has received the first or second feedback from the key device within the time limit and the first feedback is the signature, transmit the signature and the transaction message to the server.

18. The signing system of claim 14, wherein a time limit is predetermined on the client host, and the client host further comprises:
a cancellation transmission software module configured to, if the local interface module has received the first or second feedback from the key device within the time limit and the second feedback is the cancellation message, transmit an operation cancelling command to the key device; and
a cancellation receipt software module configured to receive a message reporting that operation has been cancelled from the key device.

19. The signing system of claim 14, wherein a time limit is predetermined on the client host, and a cancellation software transmission module is also configured to transmit an operation cancelling command to the key device at any time during the client host is waiting for the first or second feedback from the key device before the time limit expires.

20. The signing system of claim 13, wherein the server comprises:
a non-transitory computer readable medium having computer software modules executed by said client host, the computer software modules comprising:
  a receipt module configured to receive the transaction message and the signature from the client host;
  an obtaining module configured to obtain the key information of the transaction message according to the identifier of information for review;
  a generation module configured to generate the data packet for signing according to the key information and the separator; and
  a verification module configured to verify the signature from the client host against the data packet for signing.

* * * * *